J. LEMAY.
GARMENT CLASP.
APPLICATION FILED APR. 26, 1909.
958,411.
Patented May 17, 1910.
2 SHEETS—SHEET 1.
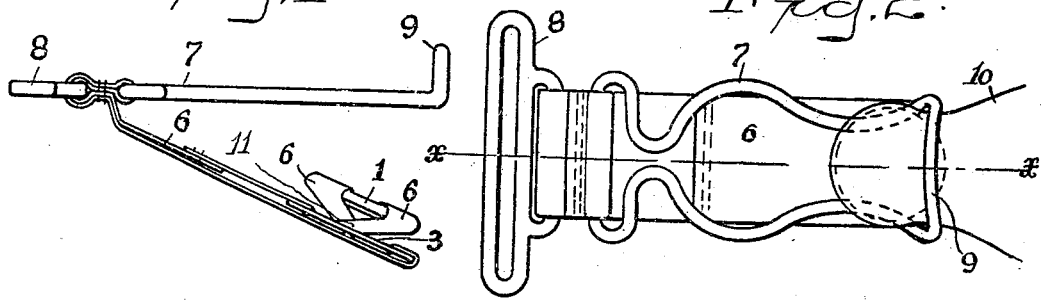
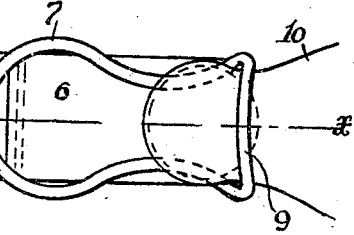
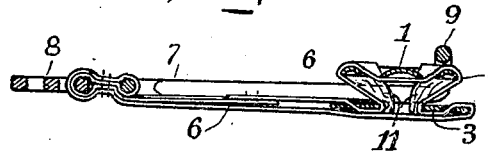
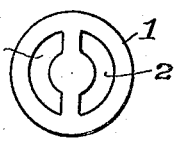
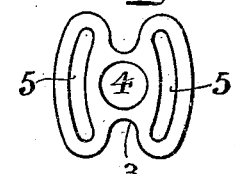
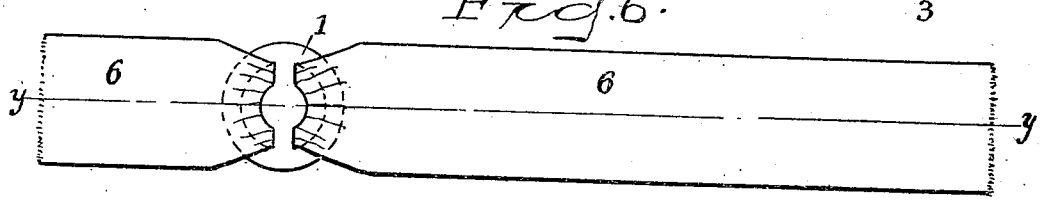
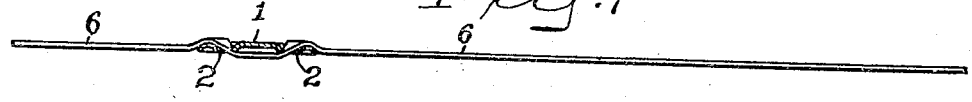
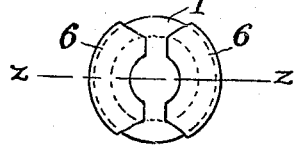
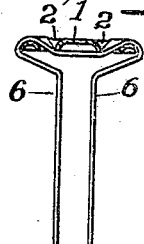
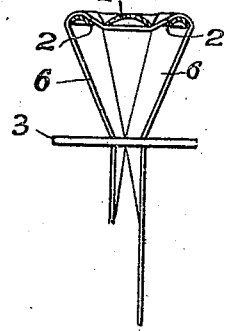
WITNESSES:
H. A. Lamb.
M. J. Lougden
INVENTOR
Joseph Lemay
BY
ATTORNEY

J. LEMAY.
GARMENT CLASP.
APPLICATION FILED APR. 26, 1909.

958,411.

Patented May 17, 1910.

2 SHEETS—SHEET 2.

WITNESSES:
H. A. Lamb.
M. J. Longden

INVENTOR
Joseph Lemay
BY
ATTORNEY

UNITED STATES PATENT OFFICE.

JOSEPH LEMAY, OF NEW YORK, N. Y.

GARMENT-CLASP.

958,411. Specification of Letters Patent. Patented May 17, 1910.

Application filed April 26, 1909. Serial No. 492,102.

*To all whom it may concern:*

Be it known that I, JOSEPH LEMAY, a citizen of the United States, residing at New York, in the county of New York and State of New York, have invented certain new and useful Improvements in Garment-Clasps; and I do hereby declare the following to be a full, clear, and exact description of the invention, such as will enable others skilled in the art to which it appertains to make and use the same.

My invention relates to certain new and useful improvements in garment clasps, but more particularly relates to clasps of the nature and style shown and described in Letters Patent No. 886,709, issued to me May 5, 1908.

The object of my present improvement is to provide a button element in which the edges and underside shall be protected so that the danger of cutting the fabric held between the button and the loop element shall be reduced to a minimum.

With these ends in view my invention consists in the details of construction and combination of parts hereinafter fully described and then particularly pointed out in the claim which concludes this description.

Figure 11:
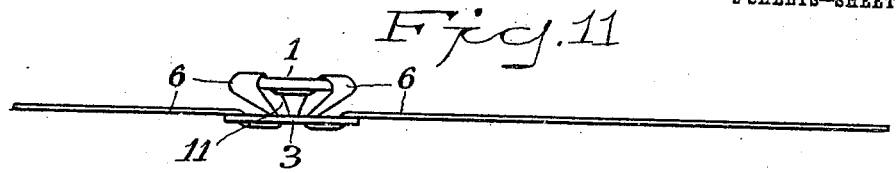
Figure 12:
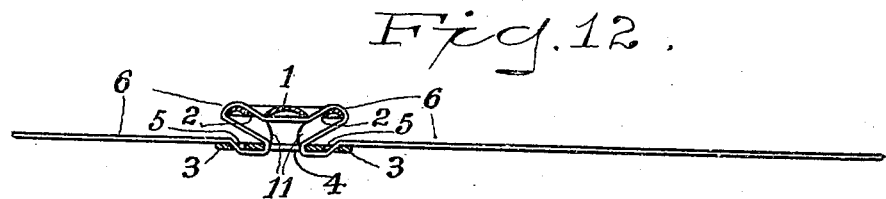
Figure 13:
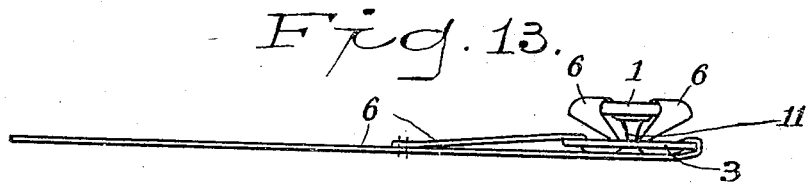
Figure 14:
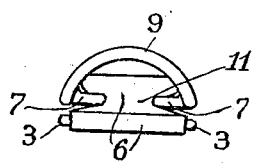
Figure 15:
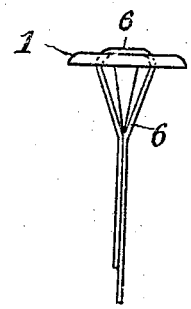

In the accompanying drawing Figure 1 is a side elevation of my improved clasp—Fig. 2 a plan view showing my improvement engaged with a fabric—Fig. 3 a section at the line $x$, $x$, of Fig. 2, the fabric being omitted—Fig. 4 a detail plan of the button head—Fig. 5 a detail plan of the button base—Fig. 6 a detail plan showing the button with the protecting webbing initially threaded therethrough—Fig. 7 a section at the line $y$, $y$, of Fig. 6—Fig. 8 a detail plan of the partially completed button element—Fig. 9 a section at the line $z$, $z$, of Fig. 8—Fig. 10 a view similar to Fig. 9 but showing the ends of the webbing initially passed through the button base—Fig. 11 a side elevation of the partly completed button element with the webbing completely threaded through the base—Fig. 12 a sectional side elevation of the construction shown at Fig. 11—Fig. 13 an elevation showing the completed button element—Fig. 14 an outer end view of the button and loop element in engaged condition, and Fig. 15 a view similar to Fig. 9 but showing a modified construction of the button element.

Similar numbers of reference denote like parts in the several figures of the drawings.

Heretofore, in devices of this description, the button element has been made of a flexible material, or has been covered both as to its head and shank with some suitable material, to prevent the cutting of the fabric held between the elements of the clasp, but in all devices of this description, so far as I know, the head and shank of the button element have always been rigid and integral, and it is the object of my present improvement to provide a button element that not only shall have a flexible shank but a firm head and base whose only connection shall be this shank itself, while at the same time the button head shall be so protected that there can be no danger of cutting the fabric, all of which will be best understood from the following description:—

1 is the button head made of any suitable material, preferably metal, having perforations 2 preferably circular in shape and oppositely disposed.

3 is the base which is of some rigid substance, preferably of metal, and having a central perforation 4 that is flanked by two elongated openings 5.

In forming my button I take a piece of webbing or other analogous material 6, and first thread it through the perforations 2 in the head 1 from the bottom of the latter as shown at Fig. 6; the ends of the webbing are then brought downwardly and passed over the edges of the head as shown at Figs. 8 and 9 and are then passed through the perforation 4 in the base, as shown at Fig. 10, and are then threaded upwardly through the openings 5 in this base, as shown at Figs. 11 and 12; the outer end of the webbing is then forced downwardly outside the edge of the base and brought beneath the latter into substantial parallelism with the other end of the webbing to which latter it is secured by any suitable stitching, as shown at Fig. 13. The webbing is then connected with the loop element 7 and the suspension plate 8 in any suitable manner, as shown at Figs. 1 and 3, and secured by stitching in such manner that the length of the webbing which carries the button is limited so that such button cannot pass out through the lower end of the loop.

From the foregoing description it will be clearly understood that the edges of the button head as well as the under portions thereof are fully protected by the webbing so that when the contracted portions of the loop element are drawn against a fabric which has been placed over the button head there can be no cutting of the fabric by any abrasion either against the shank 11 of the button or against the under portion of the latter. At the same time the shank is wholly formed by the webbing and is therefore soft and flexible while the head and base of the button connected by this shank are firm and rigid so that there can be no difficulty in the manipulation of the button element for the purposes of gripping or releasing a fabric.

In some instances it may not be deemed necessary to protect the edges of the button head, and therefore the webbing is initially threaded through the perforations 2 from the top and brought straight down immediately prior to engagement with the button base as shown at Fig. 17, and in this connection I would say that a button made in this manner would have the advantages of the flexible shank and the firm base and head, and therefore I do not wish to be limited to the protection of the edges of the button head although I much prefer such construction.

Having thus described my invention what I claim as new and desire to secure by Letters Patent is:—

In a garment clasp of the button and loop type, the combination with the loop of a button element comprising a separate rigid perforated head and a separate rigid perforated base, and webbing threaded through said head and passed over the outer edges thereof and then threaded through the perforations in the base and suitably connected to the loop.

In testimony whereof I affix my signature in presence of two witnesses.

JOSEPH LEMAY.

Witnesses:
F. W. GREENE,
J. C. HARE.